United States Patent

[11] 3,530,788

| | | | |
|---|---|---|---|
| [72] | Inventor | Oscar H. Berman, |
| | | 459½ 41st Ave. S., St. Petersburg, Florida 33705 |
| [21] | Appl. No. | 780,847 |
| [22] | Filed | Dec. 3, 1968 |
| [45] | Patented | Sept. 29, 1970 |

[54] HARD-BOILED EGG COOKING AND SHELLING DEVICE
4 Claims, 3 Drawing Figs.

[52] U.S. Cl. .................................................. 99/325, 99/353, 99/440, 146/2
[51] Int. Cl. ...................................................... A47j 29/02
[50] Field of Search ........................................... 99/325, 334, 353, 440; 146/2

[56] References Cited
UNITED STATES PATENTS

| 2,575,608 | 11/1951 | Williams ........................ | 99/440X |
| 3,411,432 | 11/1968 | Willett .......................... | 99/440X |

Primary Examiner—Billy J. Wilhite
Attorney—Kimmel, Crowell and Weaver

ABSTRACT: The present invention is directed to a device which will support an egg for cooking in a pan of water and will, after a predetermined point in the cooking operation, crack the shell and tear the double membrane surrounding the egg so that the further cooking will expand the egg and widen the cracks in the said shell; immersion in cold water, preferably running, will shrink the egg white permitting water to enter the resulting space loosening the egg for ready shelling.

Patented Sept. 29, 1970

3,530,788

INVENTOR
OSCAR H. BERMAN,

BY *Kimmel, Crowell & Weaver*
ATTORNEYS

HARD-BOILED EGG COOKING AND SHELLING DEVICE

BACKGROUND OF THE INVENTION

1. Field of the Invention

The present invention relates to hard-boiled egg cooking and shelling devices in which the egg is cracked after an initial cooking phase, so that a secondary cooking phase plus a rapid cooling by immersion in cold water can loosen the egg from the shell to permit it to be rapidly removed.

2. Description of the Prior Art

Prior art devices have provided means for cooking eggs without removing the shells and other devices for removing the shells from the completely cooked egg. No devices are known in the prior art which will crack an egg when partially cooked so that additional cooking followed by rapid cooling will loosen it from its shell.

SUMMARY OF THE INVENTION

In general, the invention consists of an egg support of openwork material which can be immersed in a pan of water for boiling the egg. A weighted object is supported on a platform which can be moved under the influence of a bimetallic strip so that when a particular predetermined temperature is reached, the platform will move and drop the weighted object upon the egg cracking the shell rupturing the attached double membranes. Further cooking will then expand the egg-white, widening the cracks in the shell so that the rapid cooling by the action of cold water and the consequent shrinking of the egg-white will permit the entry of water in the space thus created, loosening the shell and making for its ready removal.

DESCRIPTION OF THE PREFERRED EMBODIMENT

Figure 1:
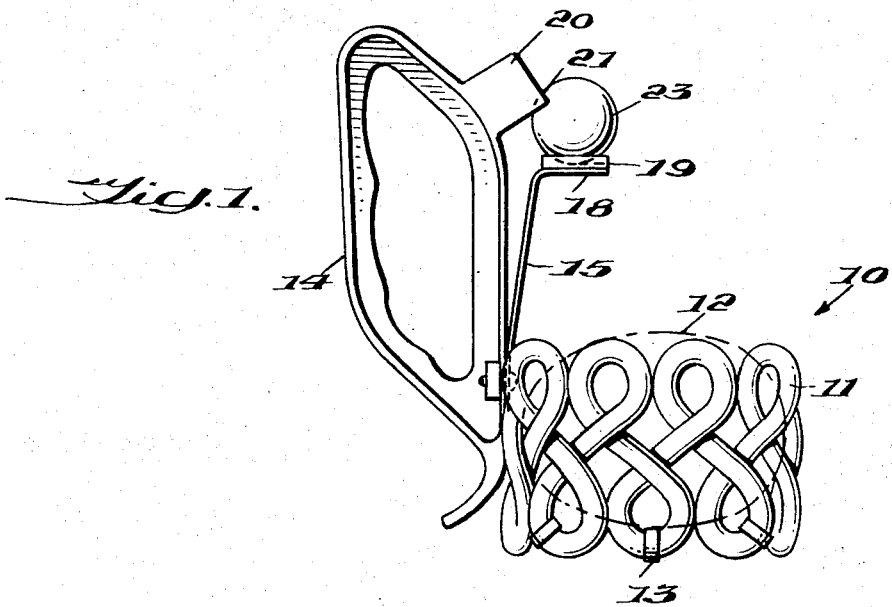
FIG. 1 is a side elevation of the invention with the egg shown supported therein in broken lines.

Referring now to the drawings in detail, wherein like reference characters indicate like parts throughout the several figures, the reference numeral 10 indicates generally an egg cooking and shelling device constructed in accordance with the invention.

Figure 2:
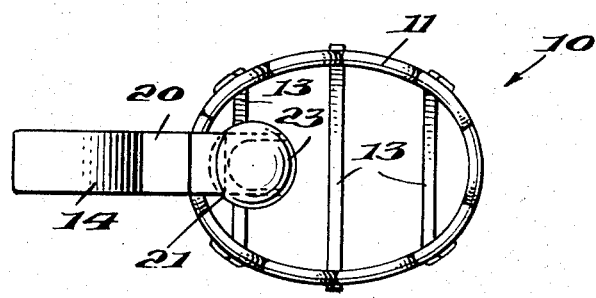
FIG. 2 is a top plan view of the invention.
Figure 3:
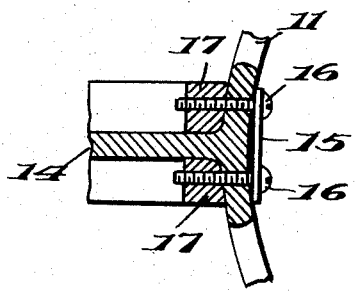
FIG. 3 is an enlarged fragmentary sectional view showing the mounting of the bimetallic strip to the egg support.

The egg cooking and shelling device 10 includes an openwork basket egg support 11 formed of ceramic, plastic, or any other suitable material, and being of a generally oval form as can be seen in FIG. 2, to receive and support an egg 12, as can be seen in FIG. 1.

A plurality of strips 13 extend across the lower portion of the egg support 11 to underlie the egg 12 to prevent it from falling through the support 11. The strips 13 are integrally formed with the egg support 11, as can be seen in FIGS. 1 and 2. A handle portion 14 is integrally formed with the egg support 11 and extends upwardly and outwardly therefrom. A bimetallic support 15 is secured to the egg support 11 by a pair of threaded bolts 16 extending through the egg support 11 adjacent the handle 15 into a pair of metallic blocks 17 which are drilled and threaded to receive the bolts 16. The bimetallic strip 15 extends upwardly adjacent the handle 14, but diverging slightly outwardly therefrom terminating in an integral horizontal portion 18 overlying the egg support 11. A weighted object support 19 is integrally formed on the horizontal portion 18 of the bimetallic strip 15. A block 20 is integrally formed with the handle 14 and has a portion 21 extending to slightly overlie the weighted object support 19.

In the use and operation of the invention, an egg 12 is placed in the egg support 11 and the device 10 is placed in a pan of water so that at least a portion of the bimetallic strip 15 is immersed therein. A weighted object 23 is supported on the support 19 in the position illustrated in FIG. 1. The water is then heated with the initial phase of heating creating a cooked egg portion surrounding and sealing in the remaining uncooked portion of the egg. At this point in the temperature rise, the bimetallic element will contract, and move toward the handle 14 so that the weighted object support 19 moves further under the block 20 and is withdrawn from under the weighted object 23 resting against the block 20, and the weighted object 23 falls on the egg 12 cracking the shell and rupturing the double membrane surrounding the egg 12. Further cooking of the egg 12 will cause the egg to expand and the cracks in the shell to widen so that a space is created around the egg by the shrinking of the eggwhite, when the egg is dumped into cold, preferably running water, so that it becomes a very simple matter to slide the shell from the egg.

Having thus described the preferred embodiment of the invention it should be understood that numerous structural modifications and adaptations may be resorted to without departing from the spirit of the invention.

I claim:

1. An egg cooking and shelling device comprising:
    an open support for an egg;
    a handle secured to said support and extending upwardly and outwardly therefrom;
    a weighted object;
    means supporting said weighted object to overlie an egg in said egg support; and
    heat controlled means for moving said weighted object off of said weighted object support to drop on the egg to rupture the shell of the egg, and the double membrane attached thereto.

2. The device as claimed in claim 1 wherein the heat controlled means for moving said weighted object off of said support includes a bimetallic element secured to said egg support and extending upwardly with its upper end integrally formed on said weighted object support.

3. The device as claimed in claim 2 wherein a block is integrally formed on said handle in a position to partially overlie said egg support and engage said weighted object to permit said bimetallic strip to withdraw said weighted object support from under said weighted object upon the application of a predetermined heat thereto.

4. The device as claimed in claim 3 wherein said egg support and said handle are formed of ceramic or plastic material and said weighted object is metallic.